US012639251B2

(12) United States Patent
Tailliet et al.

(10) Patent No.: US 12,639,251 B2
(45) Date of Patent: May 26, 2026

(54) UTILIZING A SINGLE CHIP SELECT LINE TO SUPPORT MULTIPLE PERIPHERAL COMPONENTS IN A SYNCHRONOUS SERIAL COMMUNICATION SYSTEM

(71) Applicant: STMicroelectronics International N.V., Geneva (CH)

(72) Inventors: Francois Tailliet, Fuvreau (FR); Gilles Dionis, Peynier (FR)

(73) Assignee: STMICROELECTRONICS INTERNATIONAL N.V., Geneva (CH)

( * ) Notice: Subject to any disclaimer, the term of this patent is extended or adjusted under 35 U.S.C. 154(b) by 158 days.

(21) Appl. No.: 18/483,286

(22) Filed: Oct. 9, 2023

(65) Prior Publication Data

US 2025/0117353 A1 Apr. 10, 2025

(51) Int. Cl.
G06F 13/42 (2006.01)
G06F 13/38 (2006.01)

(52) U.S. Cl.
CPC ........ G06F 13/4282 (2013.01); G06F 13/387 (2013.01)

(58) Field of Classification Search
CPC ............................ G06F 13/387; G06F 13/4282
See application file for complete search history.

(56) References Cited

U.S. PATENT DOCUMENTS

2012/0059961 A1 3/2012 Hershberger et al.
2013/0275636 A1* 10/2013 Decesaris ........... G06F 13/4291
710/110

2015/0227480 A1 8/2015 Whitaker et al.
2015/0248921 A1* 9/2015 Chen ......................... G11C 5/04
711/103
2017/0337007 A1 11/2017 Tailliet et al.
2021/0064564 A1* 3/2021 Quiquempoix ..... G06F 13/4068
2021/0216492 A1 7/2021 Lane et al.
2022/0188262 A1* 6/2022 Heckroth ............ G06F 13/4282
2023/0004516 A1* 1/2023 Hegde ................. G06F 13/4282
2023/0083877 A1 3/2023 Mishra et al.

(Continued)

OTHER PUBLICATIONS

Visconti, P., et al. "Features, Operation Principle and Limits of SPI and I2C Communication Protocols for Smart Objects: a Novel SPI-Based Hybrid Protocol Especially Suitable for IoT Applications" IJSSIS, vol. 10, No. 2, 2017, pp. 1-34. https://doi.org/10.21307/ijssis-2017-211. (Year: 2017).*

*Primary Examiner* — Eric T Oberly
(74) *Attorney, Agent, or Firm* — Alston & Bird LLP

(57) ABSTRACT

A synchronous serial communication controller, a synchronous serial communication peripheral component, and a computer-implemented method enabling synchronous serial communication between the synchronous serial communication controller and the synchronous serial communication peripheral component are provided. The example synchronous serial communication controller includes a serial communication interface, configured with a clock logic wire, a data output logic wire, a data input logic wire, and a shared select line logic wire. The shared select line logic wire is electrically connected to a plurality of peripheral components. A selected peripheral component of the plurality of peripheral components is indicated by chip identification data transmitted on the data output logic wire.

15 Claims, 7 Drawing Sheets

(56)                    References Cited

U.S. PATENT DOCUMENTS

| 2023/0195672 A1* | 6/2023 | Wen | G06F 1/10 |
| | | | 710/314 |
| 2024/0232125 A1* | 7/2024 | Wu | G06F 13/4282 |

* cited by examiner

100

114

CS1
112a

CS2
112b

CS1  CS2
SERIAL COMMUNICATION
CONTROLLER
102  CSN

DI
DO
CLK

CSn
112n

CS
CLK
DI
DO

LEGACY
PERIPHERAL
104a

CS
CLK
DI
DO

LEGACY
PERIPHERAL
104b

CS
CLK
DI
DO

LEGACY
PERIPHERAL
104n

MISO  MOSI  CLK 110  108  106

220

228

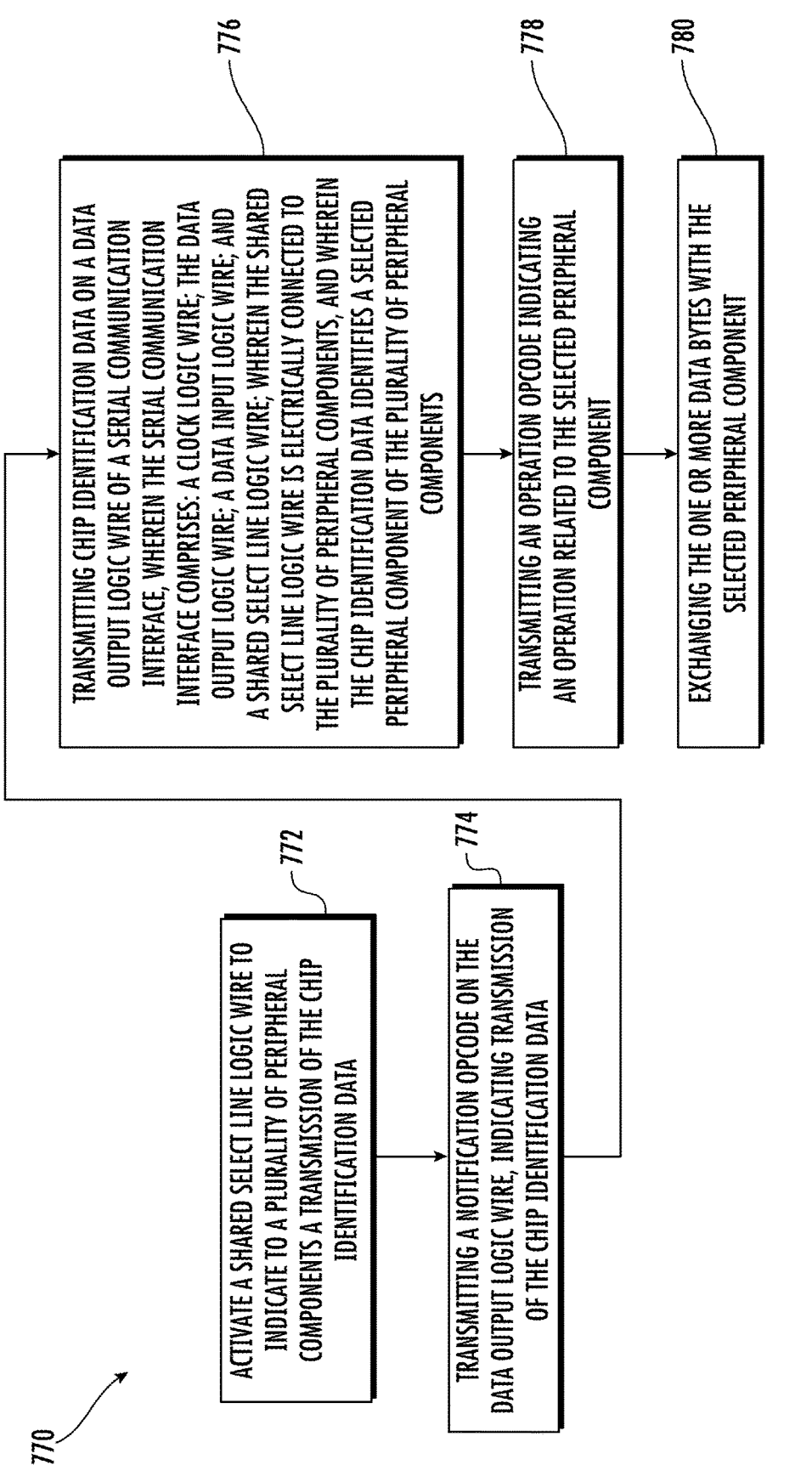

ACTIVATE A SHARED SELECT LINE LOGIC WIRE TO INDICATE TO A PLURALITY OF PERIPHERAL COMPONENTS A TRANSMISSION OF THE CHIP IDENTIFICATION DATA — 772

TRANSMITTING A NOTIFICATION OPCODE ON THE DATA OUTPUT LOGIC WIRE, INDICATING TRANSMISSION OF THE CHIP IDENTIFICATION DATA — 774

TRANSMITTING CHIP IDENTIFICATION DATA ON A DATA OUTPUT LOGIC WIRE OF A SERIAL COMMUNICATION INTERFACE, WHEREIN THE SERIAL COMMUNICATION INTERFACE COMPRISES: A CLOCK LOGIC WIRE; THE DATA OUTPUT LOGIC WIRE; A DATA INPUT LOGIC WIRE; AND A SHARED SELECT LINE LOGIC WIRE; WHEREIN THE SHARED SELECT LINE LOGIC WIRE IS ELECTRICALLY CONNECTED TO THE PLURALITY OF PERIPHERAL COMPONENTS, AND WHEREIN THE CHIP IDENTIFICATION DATA IDENTIFIES A SELECTED PERIPHERAL COMPONENT OF THE PLURALITY OF PERIPHERAL COMPONENTS — 776

TRANSMITTING AN OPERATION OPCODE INDICATING AN OPERATION RELATED TO THE SELECTED PERIPHERAL COMPONENT — 778

EXCHANGING THE ONE OR MORE DATA BYTES WITH THE SELECTED PERIPHERAL COMPONENT — 780

UTILIZING A SINGLE CHIP SELECT LINE TO SUPPORT MULTIPLE PERIPHERAL COMPONENTS IN A SYNCHRONOUS SERIAL COMMUNICATION SYSTEM

TECHNOLOGICAL FIELD

Embodiments of the present disclosure relate generally to synchronous serial communication systems, and more particularly, to supporting multiple peripheral components with a single chip select line in a synchronous serial communication system.

BACKGROUND

Electronic systems are often comprised of numerous interconnected electrical components. Interconnected electrical components often utilize a synchronous serial communication protocol, such as a Serial Peripheral Interface (SPI) protocol, to enable communication between the interconnected electrical components. In some instances, a serial communication system may utilize a controller to communicate with multiple peripheral components.

Applicant has identified many technical challenges and difficulties associated with supporting communication with multiple peripheral components in a synchronous serial communication system. Through applied effort, ingenuity, and innovation, Applicant has solved problems related to communication with multiple peripheral components in a serial communication system by developing solutions embodied in the present disclosure, which are described in detail below.

BRIEF SUMMARY

Various embodiments are directed to an example synchronous serial communication controller, an example synchronous serial communication peripheral component, and a computer-implemented method for synchronous serial communication between a synchronous serial communication controller and a plurality of synchronous serial communication peripheral components. In one embodiment, an example synchronous serial communication controller is provided. The example synchronous serial communication controller comprises a serial communication interface, comprising a clock logic wire, a data output logic wire, a data input logic wire, and a shared select line logic wire. In some embodiments, the shared select line logic wire is electrically connected to a plurality of peripheral components. In addition, a selected peripheral component of the plurality of peripheral components is indicated by chip identification data transmitted on the data output logic wire.

In some embodiments, a voltage on the shared select line logic wire is driven low to indicate to the selected peripheral a transmission of the chip identification data.

In some embodiments, the serial communication interface is electrically connected to a serial peripheral interface (SPI) bus.

In some embodiments, the shared select line logic wire is a chip select logic wire.

In some embodiments, the serial communication interface further comprises a dedicated chip select logic wire electrically connected to a legacy peripheral component.

In some embodiments, the legacy peripheral component is selected by driving an electrical signal on the dedicated chip select logic wire low.

In some embodiments, a notification opcode is transmitted on the data output logic wire, indicating transmission of the chip identification data.

An example synchronous serial communication peripheral component is further provided. In at least one embodiment, the example synchronous serial communication peripheral component comprises a serial communication interface, comprising a clock logic wire, a data output logic wire, a data input logic wire, and a shared select line logic wire. In some embodiments, the shared select line logic wire is electrically connected to a plurality of peripheral components, such that a selected peripheral component of the plurality of peripheral components is indicated by chip identification data received on the shared select line logic wire.

In some embodiments, the shared select line logic wire is activated to indicate to the selected peripheral a transmission of the chip identification data.

In some embodiments, the serial communication interface is electrically connected to a serial peripheral interface (SPI) bus.

In some embodiments, the shared select line logic wire is a chip select logic wire.

In some embodiments, a notification opcode is received on the data output logic wire, indicating transmission of the chip identification data.

In some embodiments, in an instance in which the notification opcode is not recognized by the synchronous serial communication peripheral component, the synchronous serial communication peripheral component is configured to perform one or more actions in accordance with an operation opcode.

In some embodiments, the serial communication peripheral component further comprises a local chip identifier, wherein the local chip identifier is compared to the chip identification data to determine receipt of the subsequent operation opcode and data bytes.

A computer-implemented method for synchronous serial communication between a serial communication controller and a plurality of peripheral components is also provided. In some embodiments, the computer-implement method comprises transmitting chip identification data on a data output logic wire of a serial communication interface. The serial communication interface comprises a clock logic wire, the data output logic wire, a data input logic wire. and a shared select line logic wire. The shared select line logic wire is electrically connected to the plurality of peripheral components, and the chip identification data identifies a selected peripheral component of the plurality of peripheral components. In some embodiments, the computer-implemented method further comprises transmitting an operation opcode indicating an operation related to the selected peripheral component.

In some embodiments, the computer-implemented method further comprises activating the shared select line logic wire to indicate to the plurality of peripheral components a transmission of a notification opcode.

In some embodiments, the serial communication interface is electrically connected to a serial peripheral interface (SPI) bus.

In some embodiments, the shared select line logic wire is a chip select logic wire.

In some embodiments, the serial communication interface further comprises a dedicated chip select logic wire electrically connected to a legacy peripheral component.

In some embodiments, the computer-implemented method further comprises exchanging one or more data bytes with the selected peripheral component.

In some embodiments, the computer-implemented method further comprises transmitting a notification opcode on the data output logic wire, indicating transmission of the chip identification data.

BRIEF DESCRIPTION OF THE DRAWINGS

Reference will now be made to the accompanying drawings. The components illustrated in the figures may or may not be present in certain embodiments described herein. Some embodiments may include fewer (or more) components than those shown in the figures in accordance with an example embodiment of the present disclosure.

FIG. 7 depicts a flow chart illustrating an example process for performing synchronous serial communication between a serial communication controller and a plurality of peripheral components in accordance with an example embodiment of the present disclosure.

DETAILED DESCRIPTION

Figure 1:
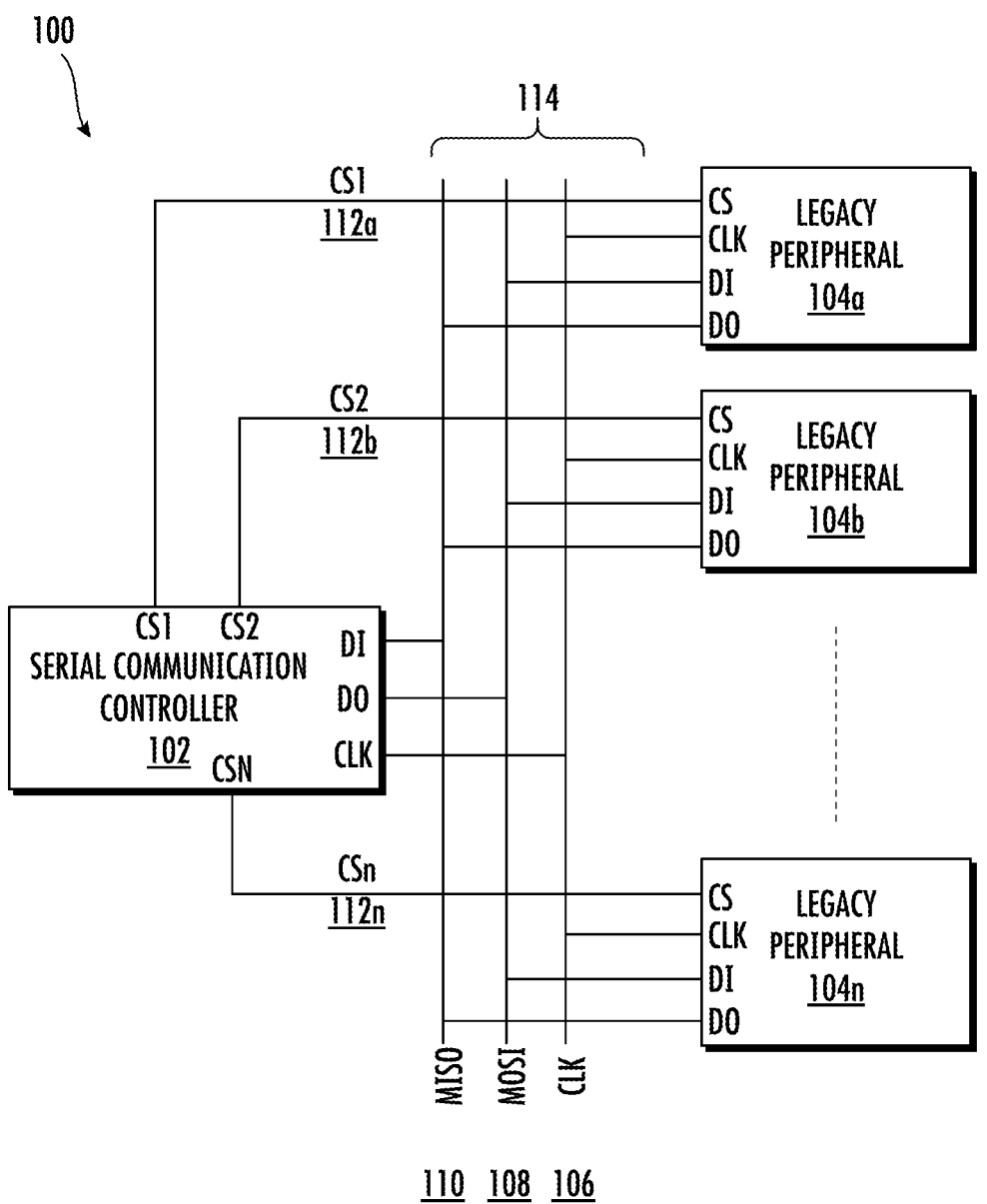
FIG. 1 illustrates an example serial communication system utilizing a chip select logic wire for each connected peripheral component in the serial communication system.

Example embodiments will be described more fully hereinafter with reference to the accompanying drawings, in which some, but not all embodiments of the inventions of the disclosure are shown. Indeed, embodiments of the disclosure may be embodied in many different forms and should not be construed as limited to the embodiments set forth herein; rather, these embodiments are provided so that this disclosure will satisfy applicable legal requirements. Like numbers refer to like elements throughout.

As described herein, the term "high" when referring to logic wires refers indicates a voltage on the logic wire above a certain minimum voltage threshold for the electronic device, generally between 1.8 volts and 3.6 volts. Similarly, the term "low" when referring to logic wires indicates a voltage is below a certain voltage threshold for the electronic device, generally at or near 0 volts. As used herein, the term "asserting" refers to switching a signal to the active state, whether that be a voltage below a certain maximum threshold on an active low logic line or a voltage above a certain minimum threshold on an active high logic line.

Various example embodiments address technical problems associated with synchronous serial communication with a plurality of peripheral components on a serial communication system. As understood by those of skill in the field to which the present disclosure pertains, there are numerous example scenarios in which a serial communication system may benefit from communicating with multiple peripherals in a space and power efficient manner.

For example, electronic systems are often comprised of numerous interconnected electrical components. In general, an electronic system may include a central electronic component, or controller, responsible for controlling and/or interfacing with a plurality of peripheral components such as memories, sensors, control devices, and other similar electronic components. Controllers commonly utilize synchronous serial communication to interface with the connected peripheral components. To support synchronous serial communication among electrical components, communication protocols such as the Serial Peripheral Interface (SPI) protocol have been devised. The SPI protocol enables synchronous serial communication between devices using four logic signals transmitted on logic wires: a clock (CLK), data out (DO), data in (DI), peripheral-in controller-out (PICO), and chip select (CS).

In a SPI communication system, the clock is generated by the controller and transmitted, along with data, to the various peripheral components. The transmitted clock enables synchronous transfer of data between the controller and any connected peripheral component. On a SPI communication system, a controller may only communicate with one peripheral component at a time. The communicating peripheral component is indicated using the chip select logic wire. In general, the chip select logic wire is an active low logic wire, meaning, when the voltage on the chip select logic wire is low or grounded, the signal is activated or asserted. During operation, the active low chip select logic wire for the target peripheral component is driven low to wake up the target peripheral component and indicate the transmission of data on the data out logic wire. Once the target peripheral component is notified, an operation opcode indicating the operation to be performed is transmitted to the target peripheral component, followed by any data bytes associated with the transaction.

Referring now to FIG. 1, a legacy serial communication system 100 (e.g., SPI) is provided. As depicted in FIG. 1, the legacy serial communication system 100 includes a serial communication controller 102 electrically connected to a serial communication interface 114 having a clock logic wire 106, a master-out, slave-in (MOSI) wire 108, and a master-in, slave-out (MISO) wire 110. The depicted serial communication interface 114 shows the MISO wire 110 electrically connecting the data-in pin of the serial communication controller 102 to the data-out pin of the legacy peripheral components 104a-104n; the MOSI wire 108 electrically connecting the data-out pin of the serial communication controller 102 to the data-in pin of the legacy peripheral components 104a-104n, and the clock logic wire 106 electrically connecting the clock pin of the serial communication controller 102 to the clock pin on the legacy peripheral components 104a-104n. In addition, the example serial communication system 100 includes a separate chip select logic wire 112a-112n electrically connected to each legacy peripheral component 104a-104n. As depicted in FIG. 1, each of the legacy peripheral components 104a-104n share the clock logic wire 106, the MOSI wire 108, and the MISO wire 110 but have a separate chip select logic wire 112a-112n for each legacy peripheral component 104a-104n.

Since each of the plurality of legacy peripheral components 104a-104n require a separate chip select logic wire 112a-112n, the example legacy serial communication system 100 depicted in FIG. 1 utilizes three logic wires plus one additional wire for each legacy peripheral component 104a-104n. As the number of legacy peripheral components 104a-104n increases, so does the number of logic wires. The increase in logic wires increases the number of input/output (I/O) pins at the controller, increasing the size and cost of the controller. In addition, routing of the chip select logic wires for each legacy peripheral component 104a-104n may be complex, adding to the cost and overall complexity of the serial communication system.

The various example embodiments described herein utilize various techniques to support multiple peripheral components in a serial communication system utilizing one or more shared select line logic wires. For example, in some embodiments, the serial communication system described herein may utilize a single chip select logic wire electrically connected to a plurality of peripheral components to manage communication between multiple peripheral components.

To support synchronized serial communication to multiple peripheral components the serial communication system described herein may utilize chip identification data in coordination with a shared select line logic wire to communicate with the connected peripheral components.

In addition, in some embodiments, a serial communication system supporting both traditional SPI peripheral components and multiple peripheral components utilizing a single shared select line logic wire may be utilized. In such an embodiment, the controller may distinguish the peripheral components sharing a shared select line logic wire and the peripheral components with a dedicated chip select logic wire. Thus, when communicating with the peripheral components sharing a shared select line logic wire, the controller may transmit chip identification data. However, for peripheral components with a dedicated chip select logic wire, the controller may communicate with the peripheral component according to the traditional serial communication system protocol.

As a result of the herein described example embodiments and in some examples, the effectiveness of a synchronized serial communication system may be greatly improved. In addition, the cost, size, and complexity of designing and manufacturing a serial communication system with multiple peripheral components may be greatly improved.

Figure 2:
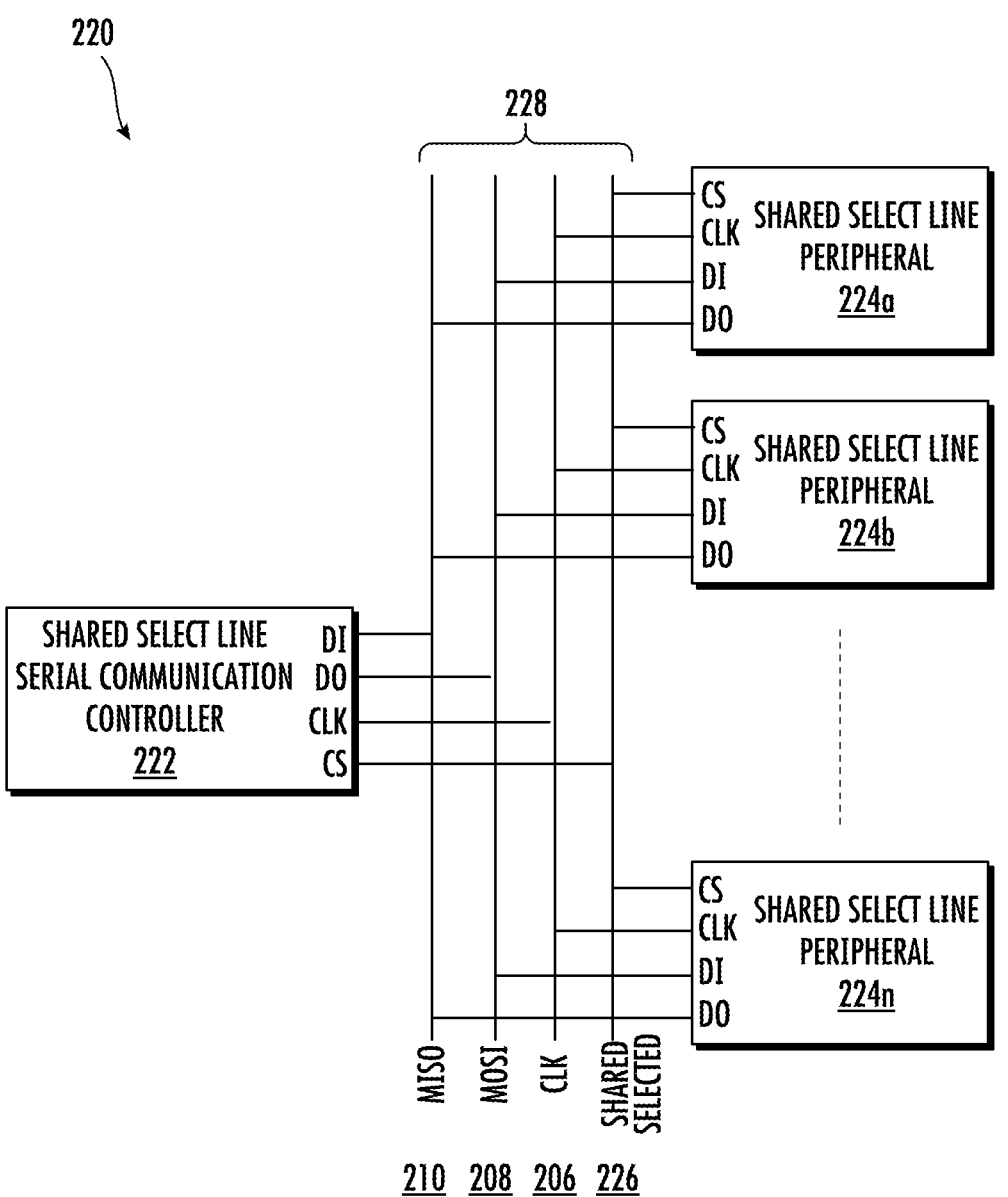
FIG. 2 illustrates an example serial communication system utilizing a single shared select line logic wire to support synchronous serial communication between a controller and a plurality of peripheral components in accordance with an example embodiment of the present disclosure.

Referring now to FIG. 2, an example shared select line serial communication system 220 is provided. As depicted in FIG. 2, the example shared select line serial communication system 220 includes a shared select line serial communication controller 222 electrically connected to a plurality of shared select line peripheral components 224a-224n via a shared select line serial communication interface 228. The depicted shared select line serial communication interface 228 shows the MISO wire 210 electrically connecting the data-in pin of the shared select line serial communication controller 222 to the data-out pin of the shared select line peripheral components 224a-224n; the MOSI wire 208 electrically connecting the data-out pin of the shared select line serial communication controller 222 to the data-in pin of the shared select line peripheral components 224a-224n, and the clock logic wire 206 electrically connecting the clock pin of the shared select line serial communication controller 222 to the clock pin on the shared select line peripheral components 224a-224n.

As depicted in FIG. 2, the example serial communication system includes a shared select line serial communication controller 222. The shared select line serial communication controller 222 may be any circuitry or device including hardware, software, and/or firmware including at least four I/O interfaces electrically connected to a shared select line serial communication interface 228. The shared select line serial communication controller 222 is further configured to generate a clock signal on the clock logic wire 206 to be transmitted to each of the connected shared select line peripheral components 224a-224n in support of synchronous serial communications. In addition, the shared select line serial communication controller 222 is configured to utilize a shared select line logic wire 226 to support communication with a plurality of shared select line peripheral components 224a-224n configured to share the shared select line logic wire 226 as further described in relation to FIG. 5. In some embodiments, the shared select line serial communication controller 222 may be further configured to utilize a chip select logic wire, transmit operation opcodes, and transmit data bytes to facilitate communication with one or more shared select line peripheral components 224a-224n in accordance with a SPI protocol.

As further depicted in relation to FIG. 2, the example serial communication interface 220 includes a plurality of shared select line peripheral components 224a-224n. A shared select line peripheral component 224a-224n is any electronic device configured to interface with a shared select line serial communication interface 228 and transmit and/or receive operational data with a shared select line serial communication controller 222 in accordance with a clock signal provided on a clock logic wire 206 by a shared select line serial communication controller 222. In addition, a shared select line peripheral component 224a-224n is configured to utilize a shared select line logic wire 226, as described herein, to transmit and receive operational data in an instance in which the shared select line serial communication controller 222 is communicating on a shared select line logic wire 226. In some embodiments, the shared select line peripheral component 224a-224n may be configured to transmit and receive operational data according to the legacy SPI protocol, for example, utilizing a dedicated chip select logic wire 112a-112b as described in relation to FIG. 1.

As further depicted in FIG. 2, the example shared select line serial communication system 220 includes a shared select line serial communication interface 228. The shared select line serial communication interface 228 comprises four signals transmitted on the clock logic wire 206, the MOSI wire 208, the MISO wire 210, and the shared select line logic wire 226.

The clock logic wire 206 transmits a clock signal generated by the shared select line serial communication controller 222. The clock logic wire 206 synchronizes transmission of operational data between the shared select line serial communication controller 222 and the selected shared select line peripheral component 224a-224n. Utilizing a clock to synchronize transactions simplifies configuration and enables much higher clock frequencies when compared to an asynchronous serial communication protocol.

The MOSI wire 208 (e.g., data output logic wire) enables the transmission of data from the shared select line serial communication controller 222 to a shared select line peripheral component 224a-224n. The MISO wire 210 (e.g., data input logic wire) enables the transmission of data from a shared select line peripheral component 224a-224n to the shared select line serial communication controller 222. In accordance with a SPI protocol, data may be sent simultaneously on both the MOSI wire 208 and the MISO wire 210.

As further depicted in FIG. 2, the example shared select line serial communication interface 228 includes a shared select line logic wire 226. A shared select line logic wire 226 is any conductive wire, cable, cord, or other conduit configured to provide an electrical connection between a shared select line serial communication controller 222 and a plurality of shared select line peripheral components 224a-224n. As described in relation to FIG. 5, a shared select line logic wire 226 is utilized in coordination with the MOSI wire 208 to support synchronized serial communication with a plurality of shared select line peripheral components 224a-224n with only a single shared select line logic wire 226. Asserting the shared select line logic wire 226 (e.g., driving the voltage below a certain maximum threshold on an active low logic wire) indicates to all electrically connected shared select line peripheral components 224a-224n to prepare to receive chip identification data, indicating the selected shared select line peripheral component 224a-224n for data transfer. The shared select line peripheral component 224a-224n matching the chip identification data may then exchange data bytes with the shared select line serial communication controller 222.

Figure 3:
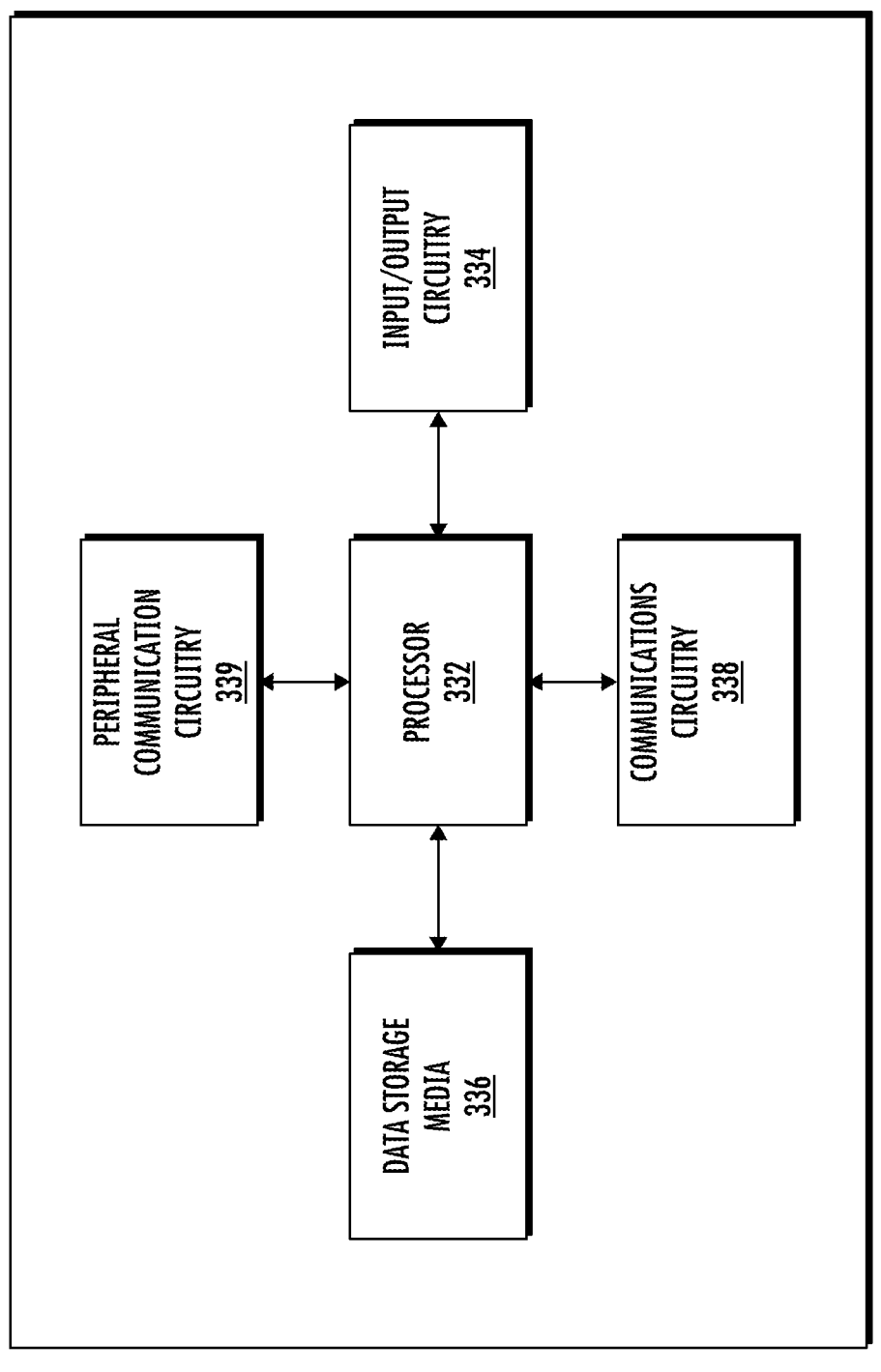
FIG. 3 depicts a block diagram of an example controller in accordance with an example embodiment of the present disclosure.

A shared select line serial communication controller 222 may be embodied by one or more computing systems such as apparatus 300 shown in FIG. 3.

FIG. 3 illustrates an example apparatus 330 in accordance with at least some example embodiments of the present disclosure. The example apparatus 330 includes processor 332, input/output circuitry 334, data storage media 336, communications circuitry 338, and peripheral communication circuitry 339. In some embodiments, the apparatus 330 is configured, using one or more of the sets of circuitry 332, 334, 336, 338, and/or 339, to execute and perform the operations described herein.

Although components are described with respect to functional limitations, it should be understood that the particular implementations necessarily include the use of particular computing hardware. It should also be understood that in some embodiments certain of the components described herein include similar or common hardware. For example, two sets of circuitry may both leverage use of the same processor(s), network interface(s), storage medium(s), and/or the like, to perform their associated functions, such that duplicate hardware is not required for each set of circuitry. The user of the term "circuitry" as used herein with respect to components of the apparatuses described herein should therefore be understood to include particular hardware configured to perform the functions associated with the particular circuitry as described herein.

Particularly, the term "circuitry" should be understood broadly to include hardware and, in some embodiments, software for configuring the hardware. For example, in some embodiments, "circuitry" includes processing circuitry, storage media, network interfaces, input/output devices, and/or the like. Alternatively or additionally, in some embodiments, other elements of the apparatus 330 provide or supplement the functionality of other particular sets of circuitry. For example, the processor 332 in some embodiments provides processing functionality to any of the sets of circuitry, the data storage media 336 provides storage functionality to any of the sets of circuitry, the communications circuitry 338 provides network interface functionality to any of the sets of circuitry, and/or the like.

In some embodiments, the processor 332 (and/or co-processor or any other processing circuitry assisting or otherwise associated with the processor) is/are in communication with the data storage media 336 via a bus for passing information among components of the apparatus 330. In some embodiments, for example, the data storage media 336 is non-transitory and may include, for example, one or more volatile and/or non-volatile memories. In other words, for example, the data storage media 336 in some embodiments includes or embodies an electronic storage device (e.g., a computer readable storage medium). In some embodiments, the data storage media 336 is configured to store information, data, content, applications, instructions, or the like, for enabling the apparatus 330 to carry out various functions in accordance with example embodiments of the present disclosure.

The processor 332 may be embodied in a number of different ways. For example, in some example embodiments, the processor 332 includes one or more processing devices configured to perform independently. Additionally or alternatively, in some embodiments, the processor 332 includes one or more processor(s) configured in tandem via a bus to enable independent execution of instructions, pipelining, and/or multithreading. The use of the terms "processor" and "processing circuitry" should be understood to include a single core processor, a multi-core processor, multiple processors internal to the apparatus 330, and/or one or more remote or "cloud" processor(s) external to the apparatus 330.

In an example embodiment, the processor 332 is configured to execute instructions stored in the data storage media 336 or otherwise accessible to the processor. Alternatively or additionally, the processor 332 in some embodiments is configured to execute hard-coded functionality. As such, whether configured by hardware or software methods, or by a combination thereof, the processor 332 represents an entity (e.g., physically embodied in circuitry) capable of performing operations according to an embodiment of the present disclosure while configured accordingly. Alternatively or additionally, as another example in some example embodiments, when the processor 332 is embodied as an executor of software instructions, the instructions specifically configure the processor 332 to perform the algorithms embodied in the specific operations described herein when such instructions are executed.

As one particular example embodiment, the processor 332 is configured to perform various operations associated with enabling synchronous communication with a plurality of shared select line peripheral components (e.g., shared select line peripheral components 224a-224n) utilizing a single shared select line logic wire (e.g., shared select line logic wire 226). In some embodiments, the processor 332 includes hardware, software, firmware, and/or a combination thereof, that drives a voltage on the multiple peripheral chip select logic wire low to indicate to a selected peripheral component a transmission of chip identification data. Additionally or alternatively, in some embodiments, the processor 332 includes hardware, software, firmware, and/or a combination thereof, that transmits a notification opcode on the data output logic wire (e.g., MOSI wire 208), indicating transmission of the chip identification data. Additionally or alternatively, in some embodiments, the processor 332 includes hardware, software, firmware, and/or a combination thereof, that transmits the chip identification data on the data output logic wire of a serial communication interface, wherein the serial communication interface comprises: a clock logic wire; the data output logic wire; a data input logic wire (e.g., MISO wire 210); and the shared select line logic wire; wherein the shared select line logic wire is electrically connected to the plurality of peripheral components, and wherein the chip identification data identifies a selected peripheral component of the plurality of peripheral components. Additionally or alternatively, in some embodiments, the processor 332 includes hardware, software, firmware, and/or a combination thereof, that transmits an operation opcode related to one or more data bytes. Additionally or alternatively, in some embodiments, the processor 332 includes hardware, software, firmware, and/or a combination thereof, that transmits the one or more data bytes to the selected peripheral component.

In some embodiments, the apparatus 330 includes input/output circuitry 334 that provides output to the user and, in some embodiments, to receive an indication of a user input. In some embodiments, the input/output circuitry 334 is in communication with the processor 332 to provide such functionality. The input/output circuitry 334 may comprise one or more user interface(s) (e.g., user interface) and in some embodiments includes a display that comprises the interface(s) rendered as a web user interface, an application user interface, a user device, a backend system, or the like. The processor 332 and/or input/output circuitry 334 comprising the processor may be configured to control one or more functions of one or more user interface elements through computer program instructions (e.g., software and/or firmware) stored on a memory accessible to the processor (e.g., data storage media 336, and/or the like). In some embodiments, the input/output circuitry 334 includes or utilizes a user-facing application to provide input/output functionality to a client device and/or other display associated with a user.

In some embodiments, the apparatus 330 includes communications circuitry 338. The communications circuitry 338 includes any means such as a device or circuitry embodied in either hardware or a combination of hardware and software that is configured to receive and/or transmit data from/to a network and/or any other device, circuitry, or module in communication with the apparatus 330. In this regard, the communications circuitry 338 includes, for example in some embodiments, a network interface for enabling communications with a wired or wireless communications network. Additionally or alternatively in some embodiments, the communications circuitry 338 includes one or more network interface card(s), antenna(s), bus(es), switch(es), router(s), modem(s), and supporting hardware, firmware, and/or software, or any other device suitable for enabling communications via one or more communications network(s). Additionally or alternatively, the communications circuitry 338 includes circuitry for interacting with the antenna(s) and/or other hardware or software to cause transmission of signals via the antenna(s) or to handle receipt of signals received via the antenna(s). In some embodiments, the communications circuitry 338 enables transmission to and/or receipt of data from a client device in communication with the apparatus 330.

In some embodiments, the apparatus 330 includes peripheral communication circuitry 339. The peripheral communication circuitry 339 includes hardware, software, firmware, and/or a combination thereof, that supports various functionality associated with performing synchronous serial communication with one or more electrically connected peripheral components (e.g., legacy peripheral components 104a-104n, shared select line peripheral components 224a-224n). Various functionality executed by the peripheral communication circuitry 339 may include driving the clock voltage on the clock logic wire (e.g., clock logic wire 106, 206), driving the voltage on the chip select wire (e.g., chip select logic wire 112a-112n, shared select line logic wire), driving the voltage on the data output logic wire (e.g., MOSI wire 208) to transmit data bytes to the selected peripheral component, receiving data from a selected peripheral component on the data input logic wire (e.g., MISO wire 210), and other functionality associated with synchronous serial communication.

Additionally or alternatively, in some embodiments, one or more of the sets of circuitry 332-339 are combinable. Additionally or alternatively, in some embodiments, one or more of the sets of circuitry perform some or all of the functionality described associated with another component. For example, in some embodiments, one or more sets of circuitry 332-339 are combined into a single module embodied in hardware, software, firmware, and/or a combination thereof. Similarly, in some embodiments, one or more of the sets of circuitry, for example peripheral communication circuitry 339, is/are combined such that the processor 332 performs one or more of the operations described above with respect to each of these circuitry individually.

Figure 4:
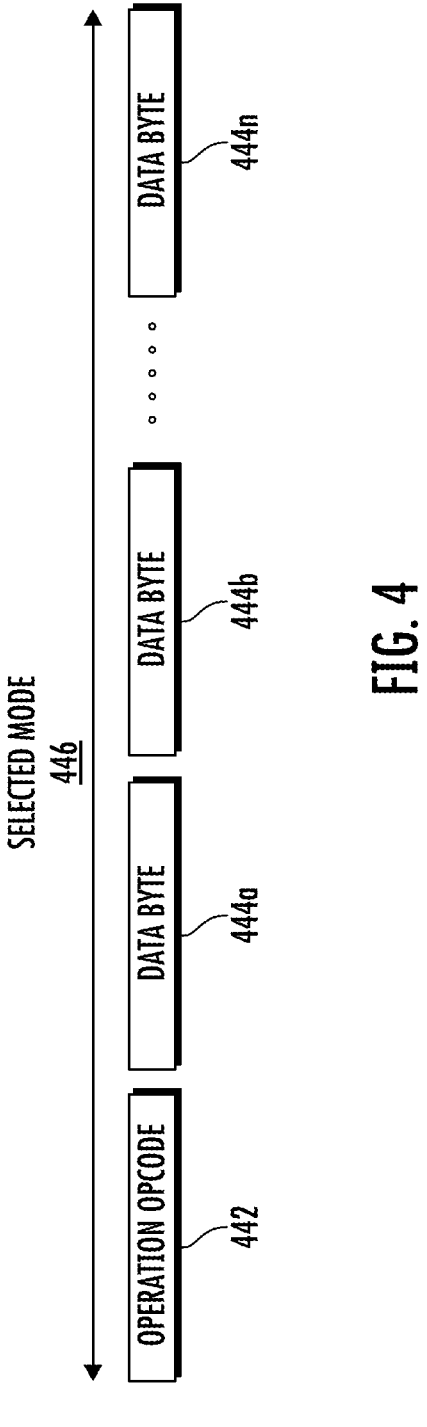
FIG. 4 depicts an example of a legacy serial communication operational data sequence on a data output logic wire.

Referring now to FIG. 4, an example serial communication operational data sequence 440 in compliance with synchronous serial communication on a legacy serial communication system (e.g., legacy serial communication system 100) is provided. As depicted in FIG. 4, the example serial communication operational data sequence 440 complies with the legacy SPI protocol. The example serial communication operational data sequence 440 includes a selected mode 446 during which an operation opcode 442 followed by a plurality of data bytes 444a-444n are transmitted.

As depicted in FIG. 4, the example serial communication operational data sequence 440 is transmitted on the data output logic wire (e.g., MOSI wire 208) during a selected mode 446. The selected mode 446 is a period during which a peripheral component is selected to exchange data with the serial communication controller on the data input logic wire (e.g., MISO wire 210) and the data output logic wire. For example, a peripheral component (e.g., legacy peripheral component 104a-104n) has been selected by asserting the chip select logic wire (e.g., chip select logic wire 112a-112n) associated with the peripheral component. Since a legacy SPI protocol includes a dedicated chip select logic wire for each peripheral component, to select a peripheral component the chip select logic wire for the selected peripheral component is asserted (e.g., driven to a low voltage), while the chip select logic wires for all other peripheral components are de-asserted (e.g., voltage is held high). Dedicating a chip select logic wire to each peripheral component increases the number of input/output (I/O) pins at the controller, increasing the size and cost of the legacy serial communication controller. In addition, routing of the chip select logic wires for each legacy peripheral component may add to the complexity and overall cost of the serial communication system.

As further depicted in FIG. 4, the example serial communication operational data sequence 440 includes an operation opcode 442 followed by zero or more data bytes 444a-444n transmitted on the data out logic wire. An operation opcode 442 is any transmitted sequence of data indicating an operation to be performed by and/or on the selected peripheral component. Data bytes 444a-444n are any sequence of electronic data necessary to perform the operation indicated by the operation opcode 442. For example, in some embodiments, an operation opcode 442 may indicate a write operation to be performed on the selected peripheral component. In such an instance, the operation opcode 442 may be followed by a plurality of data bytes 444a-444n indicated the memory location for the data to be written to and/or providing the data to be stored on the selected peripheral component. In another example, an operation opcode 442 may indicate a read operation, for example, a read of a specific memory or sensor value. In such an instance, the operation opcode 442 may not be followed succeeded by any data bytes 444a-444n. However, the selected peripheral component may transmit one or more data bytes on the data input logic wire providing the requested data. In some embodiments, an operation opcode 442 may comprise two bytes or 16 bits of data. The operation indicated by the operation opcode 442 may vary based on the specific peripheral component. Some example operations indicated by an operation opcode 442 may include a read operation, a write operation, a write enable operation, a status register read operation, a status register write operation, a serial number/device ID read operation, and so on.

In some embodiments, a shared select line peripheral component (e.g., shared select line peripheral component 224a-224n) may receive a serial communication operational data sequence 440. In such an instance, the shared select line peripheral component may recognize the absence of a notification opcode (e.g., operation opcode 442 as described in reference to FIG. 5) and perform operations as indicated by the operation opcode 442.

Figure 5:
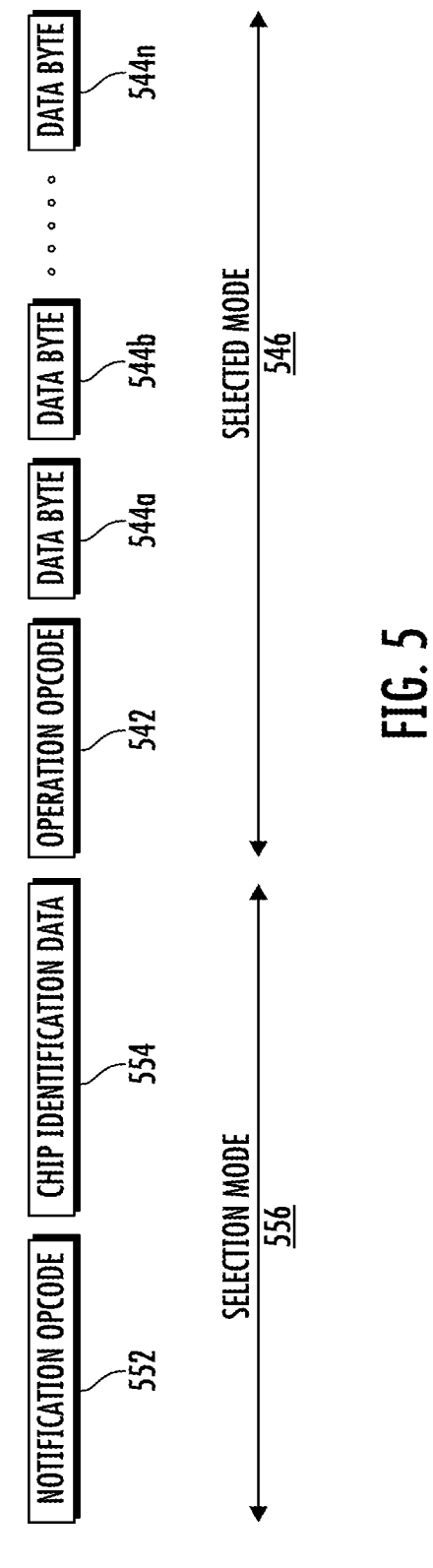
FIG. 5 depicts an example serial communication stream for communicating with a plurality of peripheral components of a serial communication system utilizing a single shared select line logic wire in accordance with an example embodiment of the present disclosure.

Referring now to FIG. 5, an example serial communication operational data sequence 550 for a serial communication system (e.g., shared select line serial communication system 220) utilizing a shared select line logic wire (e.g., shared select line logic wire 226) is provided. As depicted in FIG. 5, the example serial communication operational data sequence 550 transmitted on the data output logic wire (e.g., MOSI wire 208) includes a selection mode 556 and a selected mode 546. During selection mode 556 of a shared select line serial communication controller (e.g., shared select line serial communication controller 222) transmits a notification opcode 552 and chip identification data 554 on the data output logic wire. During the selected mode 546, the shared select line serial communication controller transmits an operation opcode 542 on the data output logic wire followed by a plurality of data bytes 544a-544n.

As depicted in FIG. 5, a shared select line serial communication controller transmits a notification opcode 552 and chip identification data 554 on the MOSI wire 208 during the selection mode 556. During the selection mode 556 of a shared select line serial communication system, the shared select line logic wire is asserted. Thus, all shared select line peripheral components utilizing the shared select line logic wire prepare to receive incoming data on the data output logic wire. During the selection mode 556, the selected peripheral component is identified through the transmission of a notification opcode 552 and chip identification data 554.

A notification opcode 552 may be any sequence of data including bits, bytes, numbers, characters, or other data representation, indicating the chip select line connected to the peripheral component is a shared select line logic wire and further indicating the subsequent transmission of chip identification data 554. In some embodiments, the notification opcode 552 may comprise one byte (or 8 bits) of data. The peripheral components (e.g., shared select line peripheral components) configured to support a shared select line serial communication system may be configured to recognize the notification opcode 552. For example, a shared select line serial communication controller may be configured to transmit 8'b01100110 as a notification opcode 552. The shared select line peripheral components may be configured to recognize the 8'b01100110 notification opcode 552 and prepare to receive the subsequent chip identification data 554. In some embodiments, the notification opcode 552 may comprise an unused opcode in the SPI protocol standard.

Chip identification data 554 may be any sequence of data including bits, bytes, numbers, characters, or other data representation identifying one or more shared select line peripheral components as the selected peripheral component for the serial communication operation. A shared select line peripheral component is assigned an identifier, for example, a bit sequence, a serial number, a universally unique identifier (UUID), a string of characters, or other identification data. The identifier may be hard-wired in external pins, stored in non-volatile memory, or otherwise accessible to the peripheral component. In an instance in which the received chip identification data 554 matches the identifier of the peripheral component, the peripheral component is selected and operates as if a dedicated chip select logic wire has been asserted. The peripheral components containing identifiers not matching the received chip identification data 554 operate as if a dedicated chip select logic wire is de-asserted.

As further depicted in FIG. 5, a shared select line serial communication controller transmits an operation opcode 542 and zero or more data bytes 544a during the selected mode 546. As described in relation to FIG. 4, during the selected mode 546 of a shared select line serial communication system, an operation is identified by the operation opcode 542 and the associated data bytes 544a-544n required to conduct the operation are transmitted. During the selected mode 546, peripheral components not identified as a selected peripheral component operate as if the shared select line logic wire is de-asserted and await the re-assertion of the shared select line logic wire.

Figure 6:
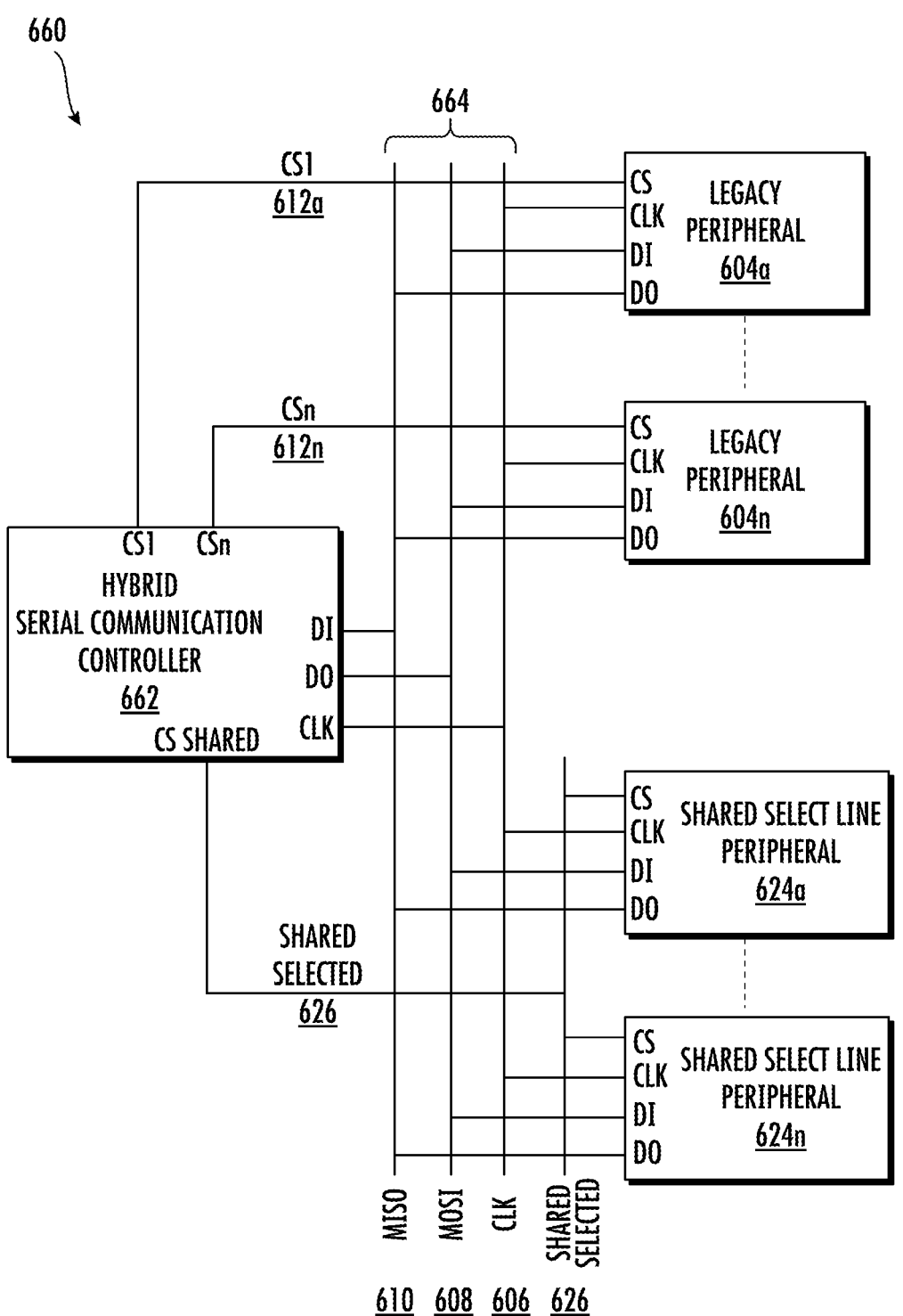
FIG. 6 illustrates an example serial communication system supporting synchronous serial communication between a serial communication controller, legacy peripheral components and a plurality of peripheral components configured in accordance with an example embodiment of the present disclosure.

Referring now to FIG. 6, an example hybrid serial communication system 660 is provided. As depicted in FIG. 6, the example hybrid serial communication system 660 includes a plurality of legacy peripheral components 604a-604n and a plurality of shared select line peripheral components 624a-624n. The depicted hybrid serial communication system 660 shows the MISO wire 610 (e.g., data input logic wire) electrically connecting the data-in pin of the hybrid serial communication controller 662 to the data-out pin of the shared select line peripheral components 624a-624n and the data-out pin of the legacy peripheral components 604a-604n. The depicted hybrid serial communication system 660 further shows the MOSI wire 608 (e.g., data output logic wire) electrically connecting the data-out pin of the hybrid serial communication controller 662 to the data-in pin of the shared select line peripheral components 624a-624n and the data-in pin of the legacy peripheral components 604a-604n. As further depicted in FIG. 6, the clock logic wire 606 electrically connects the clock pin of the hybrid serial communication controller 662 to the clock pin on the shared select line peripheral components 624a-624n and the clock pin on the legacy peripheral components 604a-604n.

The chip select pin of each legacy peripheral component 604a-604n is electrically connected to the hybrid serial communication controller 662 with a dedicated chip select logic wire 612a-612n. However, the chip select pin of each shared select line peripheral component 624a-624n is electrically connected to a shared select line logic wire 626 at a chip select shared pin.

As depicted in FIG. 6, the hybrid serial communication controller 662 is configured to interface with a serial communication interface 664 including a shared MISO wire 610, a shared MOSI wire 608, a shared clock logic wire 606, a shared select line logic wire 626, and a plurality of chip select logic wires 612a-612n. As described herein, the hybrid serial communication controller 662 is configured to generate and transmit a clock on the clock logic wire 606 to support synchronous communication. In addition, the hybrid serial communication controller 662 generates electronic signals to transmit data on the shared MOSI wire 608 and is configured to receive electronic data on the shared MISO wire 610.

In order to support serial communication in an instance in which the serial communication interface 664 comprises both legacy peripheral components 604a-604n and shared select line peripheral components 624a-624n, a hybrid serial communication controller 662 operates according to the standard synchronous serial communication protocol. For example, the hybrid serial communication controller 662 may assert (e.g., pull the voltage low) the chip select logic wire 612a-612n associated with the selected legacy peripheral component 604a-604n and de-assert (e.g., leave voltage high) on all other select logic wires (e.g., other chip select logic wires 612a-612n and the shared select line logic wire 626). Once the legacy peripheral component 604a-604n is selected, the hybrid serial communication controller 662 may communicate with the selected legacy peripheral component 604a-604n as described in relation to FIG. 4.

In an instance in which the hybrid serial communication controller 662 initiates communication with a shared select line peripheral component 624a-624n utilizing a shared select line logic wire 626, the hybrid serial communication controller 662 may assert (e.g., pull the voltage low) the shared select line logic wire 626 and de-assert (e.g., leave voltage high) the chip select logic wires 612a-612n associated with the legacy peripheral components 604a-604n. The hybrid serial communication controller 662 may then transmit the notification opcode (e.g., notification opcode 552) and the chip identification data (e.g., chip identification data 554) indicating the selected shared select line peripheral component 624a-624n. Once the selected shared select line peripheral component 624a-624n is indicated, the hybrid serial communication controller 662 may initiate one or more operations as described in relation to FIG. 5.

In an instance in which a shared select line peripheral component 624a-624n is electrically connected to a serial communication controller (e.g., serial communication controller 102, shared select line serial communication controller 222, hybrid serial communication controller 662) via a dedicated chip select logic wire (e.g., chip select logic wire 612a-612n, the shared select line peripheral component 624a-624n may continue to operate as a legacy peripheral component. For example, in an instance in which the chip select line is asserted and data is received on the shared MOSI wire 608, if the received data does not match the notification opcode, the shared select line peripheral component 624a-624n may interpret the received data as an operation opcode and execute according to the received operation.

Referring now to FIG. 7 an example process 770 for performing synchronous serial communication between a serial communication controller (e.g., shared select line serial communication controller 222, hybrid serial communication controller 662) and a plurality of peripheral components (e.g., legacy peripheral components 104a-104n, 604a-604n, shared select line peripheral components 224a-

224n, 624a-624n) utilizing a shared select line logic wire (e.g., shared select line logic wire 226, 626) is provided. At block 772, a serial communication controller activates the shared select line logic wire to indicate to the plurality of peripheral components a transmission of the chip identification data (e.g., chip identification data 554). As described herein, a shared select line logic wire may be activated, or asserted, by driving the voltage low on the shared select line logic wire in an active low configuration, or by driving the voltage high on the shared select line logic high in an active high configuration. Activating the shared select line logic wire alerts all connected peripheral components of the subsequent transmission of electronic data on the data MOSI wire (e.g., MOSI wire 108, 208, 608).

At block 774, the serial communication controller transmits a notification opcode (e.g., notification opcode 552) on the data output logic wire (e.g., MOSI wire 208, 608), indicating transmission of the chip identification data. As described in relation to FIG. 5, a notification opcode is transmitted to all shared select line peripheral components (e.g., shared select line peripheral components 224a-224n, 624a-624n. The notification opcode is a uniquely identifiable opcode that indicates the shared select line logic wire may be shared by a plurality of shared select line peripheral components, thus, chip identification data indicating the selected shared select line peripheral component is transmitted. In an instance in which the notification opcode is not transmitted, but instead data matching an operation opcode (e.g., operation opcode 542) is transmitted, the shared select line peripheral component may operate according to the legacy serial communication operational data sequence as described in relation to FIG. 4.

At block 776, the serial communication controller transmits chip identification data on a data output logic wire of a serial communication interface, wherein the serial communication interface comprises: a clock logic wire; the data output logic wire; a data input logic wire (e.g., MISO wire 210, 610); and a shared select line logic wire; wherein the shared select line logic wire is electrically connected to the plurality of peripheral components, and wherein the chip identification data identifies a selected peripheral component of the plurality of peripheral components. As described herein, each shared select line peripheral component is assigned an identifier, for example, a bit sequence, a serial number, a universally unique identifier (UUID), a string of characters, or other identification data. The identifier may be hard-wired in external pins, stored in non-volatile memory, or otherwise accessible to the peripheral component. Each peripheral component compares the transmitted chip identification data to the identifier assigned to the peripheral component. In an instance in which the received chip identification data matches the identifier of the peripheral component, the peripheral component is selected and operates as if a dedicated chip select logic wire has been asserted. The peripheral components assigned identifiers not matching the received chip identification data operate as if a dedicated chip select logic wire is de-asserted.

At block 778, the serial communication controller transmits an operation opcode indicating an operation related to the selected peripheral component. The operation opcode indicates to the selected peripheral component the operation to be performed on or by the selected peripheral component. For example, the operation opcode may indicate a memory write, a read of a specific register, or other operation.

At block 780, the serial communication controller exchanges the one or more data bytes with the selected peripheral component. In some embodiments, the operation indicated by the operation opcode may include one or more data bytes transmitted by the serial communication controller on the data output logic wire. For example, a memory write operation may include the transmission of a memory address and the data to be written. In some embodiments, the operation indicated by the operation opcode may include one or more data bytes transmitted by the selected peripheral component to the serial communication controller on the data input logic wire. For example, a memory read operation may require the transmission of data bytes containing the data read from an indicated memory location. Still, some operations indicated by the operation opcode may require no additional data bytes to be transmitted through the serial communication interface.

While this detailed description has set forth some embodiments of the present invention, the appended claims cover other embodiments of the present invention which differ from the described embodiments according to various modifications and improvements. For example, one skilled in the art may recognize that such principles may be applied to any electronic device utilizing a synchronized serial communication system. For example, any electronic devices comprising memory components, sensors, or control devices communicating via a SPI protocol. Within the appended claims, unless the specific term "means for" or "step for" is used within a given claim, it is not intended that the claim be interpreted under 35 U.S.C. 112, paragraph 6.

Use of broader terms such as "comprises," "includes," and "having" should be understood to provide support for narrower terms such as "consisting of," "consisting essentially of," and "comprised substantially of" Use of the terms "optionally," "may," "might," "possibly," and the like with respect to any element of an embodiment means that the element is not required, or alternatively, the element is required, both alternatives being within the scope of the embodiment(s). Also, references to examples are merely provided for illustrative purposes, and are not intended to be exclusive.

The invention claimed is:

1. A synchronous serial communication controller comprising:
 a serial communication interface, comprising:
  a clock logic wire;
  a data output logic wire;
  a data input logic wire;
  a dedicated chip select logic wire electrically connected exclusively between a legacy peripheral component and the synchronous serial communication controller, wherein serial communication data intended for the legacy peripheral component is indicated exclusively based on an asserted state of the dedicated chip select logic wire; and
  a shared select line logic wire electrically connected to a plurality of peripheral components, wherein serial communication with a selected peripheral component of the plurality of peripheral components is initiated by transmission of a notification opcode followed by chip identification data transmitted on the data output logic wire.

2. The serial communication controller of claim 1, wherein a voltage on the shared select line logic wire is driven low to indicate to the selected peripheral component a transmission of the chip identification data.

3. The serial communication controller of claim 1, wherein the serial communication interface is electrically connected to a serial peripheral interface (SPI) bus.

4. The serial communication controller of claim 3, wherein the shared select line logic wire is a chip select logic wire.

5. The serial communication controller of claim 1, wherein the legacy peripheral component is selected by driving an electrical signal on the dedicated chip select logic wire low.

6. A synchronous serial communication system comprising:
 a synchronous serial communication peripheral component comprising:
  a first serial communication interface, comprising:
   a clock logic wire;
   a data output logic wire;
   a data input logic wire; and
   a shared select line logic wire electrically connected to a plurality of peripheral components, wherein serial communication with a selected peripheral component of the plurality of peripheral components is initiated by reception of a notification opcode followed by chip identification data received on the shared select line logic wire; and
 a synchronous serial communication legacy peripheral component comprising:
  a second serial communication interface comprising:
   the clock logic wire;
   the data output logic wire;
   the data input logic wire; and
   a dedicated chip select logic wire electrically connected exclusively between a legacy peripheral component and a synchronous serial communication controller, wherein serial communication data intended for the legacy peripheral component is indicated exclusively based on an asserted state of the dedicated chip select logic wire.

7. The synchronous serial communication system of claim 6, wherein the shared select line logic wire is activated to indicate to the synchronous serial communication peripheral component a transmission of the chip identification data.

8. The synchronous serial communication system of claim 6, wherein the first serial communication interface of the synchronous serial communication peripheral component is electrically connected to a serial peripheral interface (SPI) bus.

9. The synchronous serial communication system of claim 8, wherein the shared select line logic wire is a chip select logic wire.

10. The synchronous serial communication system of claim 6, wherein in an instance in which the notification opcode is not recognized by the synchronous serial communication peripheral component, the synchronous serial communication peripheral component is configured to perform one or more actions in accordance with an operation opcode.

11. The synchronous serial communication system of claim 6, wherein the synchronous serial communication peripheral component further comprises a local chip identifier, wherein the local chip identifier is compared to the chip identification data to determine receipt of a subsequent operation opcode and data bytes.

12. A computer-implemented method for synchronous serial communication between a serial communication controller and a plurality of peripheral components, the computer-implement method comprising:
 initiating serial communication with a selected peripheral component of the plurality of peripheral components by transmitting a notification opcode followed by chip identification data on a data output logic wire of a serial communication interface, wherein the serial communication interface comprises:
 a clock logic wire;
 the data output logic wire;
 a data input logic wire;
 a dedicated chip select logic wire electrically connected exclusively between a legacy peripheral component and the serial communication controller, wherein serial communication data intended for the legacy peripheral component is indicated exclusively based on an asserted state of the dedicated chip select logic wire; and
 a shared select line logic wire; and
transmitting an operation opcode indicating an operation related to the selected peripheral component.

13. The computer-implemented method of claim 12, further comprising:
 activating the shared select line logic wire to indicate to the plurality of peripheral components the transmission of the notification opcode.

14. The computer-implemented method of claim 12, wherein the serial communication interface is electrically connected to a serial peripheral interface (SPI) bus.

15. The computer-implemented method of claim 12, further comprising:
 exchanging one or more data bytes with the selected peripheral component.

* * * * *